United States Patent
James et al.

[11] 3,830,127
[45] Aug. 20, 1974

[54] WOOD CUTTING MITRE SAW

[76] Inventors: Urban E. James, P.O. Box 91; Glen B. Barton, P.O. Box 127, both of Calhoun City, Miss. 38916

[22] Filed: Mar. 28, 1973

[21] Appl. No.: 345,697

[52] U.S. Cl................ 83/435.1, 83/425.2, 83/522, 83/581
[51] Int. Cl............................................. B27b 27/06
[58] Field of Search ....... 83/409, 425.2, 425, 435.1, 83/437, 477.2, 444, 581, 522, 466.1; 144/216, 217

[56] References Cited
UNITED STATES PATENTS

| | | | |
|---|---|---|---|
| 901,699 | 10/1908 | Fetzer................................ | 83/435.1 |
| 1,048,319 | 12/1912 | Knights.............................. | 83/435.1 |
| 2,905,210 | 9/1959 | Thomas.......................... | 83/435.1 X |
| 2,998,813 | 9/1961 | Wilson............................. | 83/435.1 X |

*Primary Examiner*—Donald R. Schran
*Attorney, Agent, or Firm*—Clarence A. O'Brien; Harvey B. Jacobson

[57] ABSTRACT

A table saw including a top having a vertical powered rotary saw blade journaled from the table with its lower peripheral portion spaced slightly above the upper surface of the top thereof. A floating work support panel is provided and the tabletop and panel include coacting structure supporting the panel from the top in overlying relation relative to the top for guided rectilinear horizontal shifting along a path normal to the axis of rotation of the blade. The lower periphery of the blade projects slightly below the upper surface of the panel and the panel has a shallow upwardly opening groove formed therein aligned with and in which the lower periphery of the blade is receivable when the work supporting panel is shifted toward the blade. Also, workpiece supporting structure is carried by the panel for supporting a workpiece in predetermined position thereon with a portion of the workpiece overlying the groove, whereby the panel, with the workpiece supported therefrom, may be shifted toward the blade in order to cut the workpiece along a vertical plane containing the groove formed in the panel in which the lower periphery of the blade is receivable. Also, the workpiece supporting structure carried by the panel is operative to adjustably angularly displace the workpiece supported therefrom about a vertical axis contained in the plane in which the blade is disposed.

7 Claims, 10 Drawing Figures

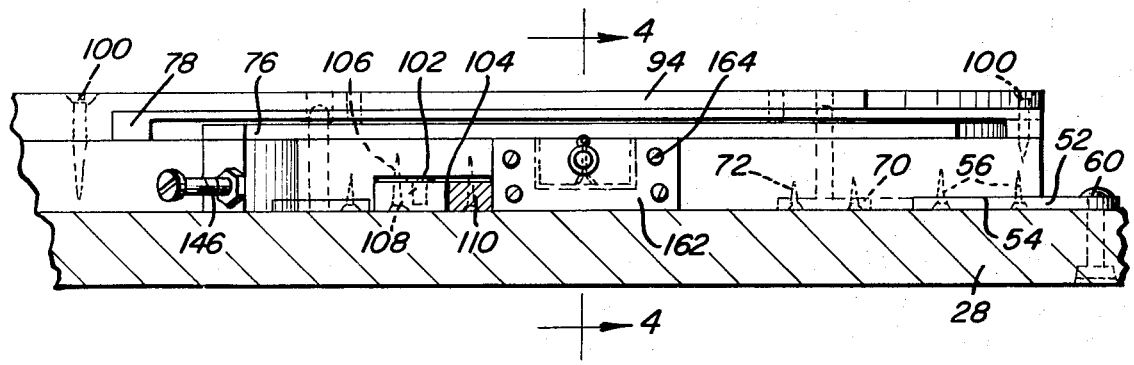
Fig. 3
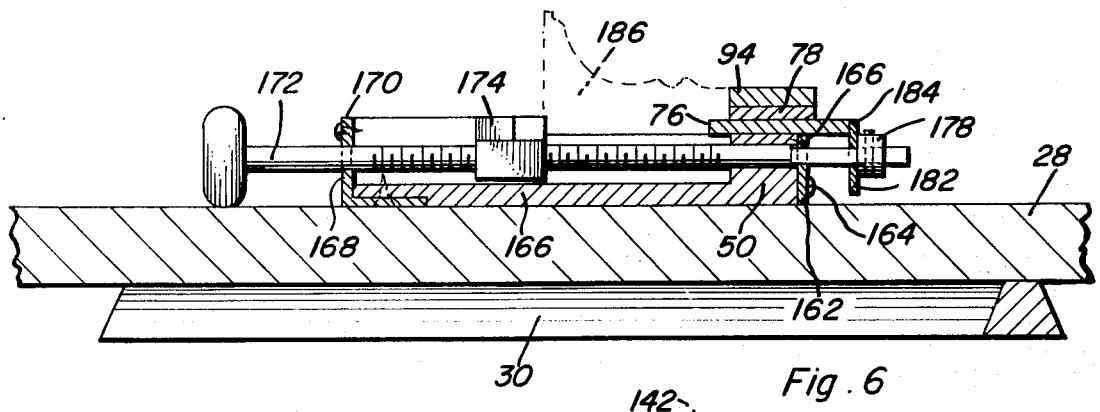
Fig. 4
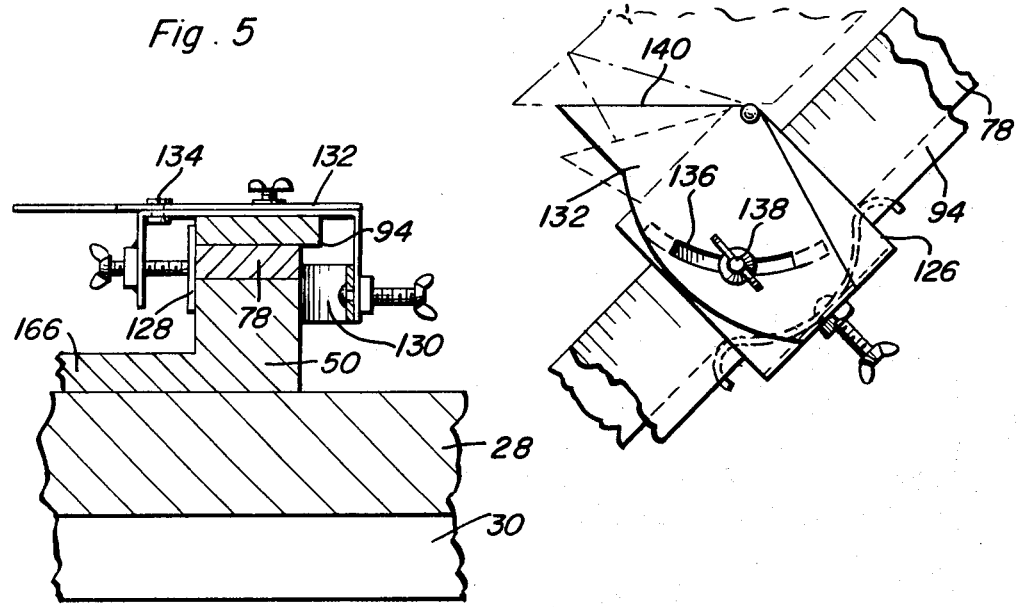
Fig. 5
Fig. 6

3,830,127

WOOD CUTTING MITRE SAW

The table saw of the instant invention has been primarily designed to provide a saw structure whereby framing members may be precisely mitred as desired. In addition, the table saw also includes workpiece supporting structure specifically adapted to clampingly engage and guidingly support picture framing members including lip grooves.

The main object of this invention is to provide a table saw specifically designed for making mitre cuts and which is extremely simple to use and provided with controls for precisely positioning the workpiece and advancing the workpiece toward the saw disposed wholly above the top of the table saw.

Another object of this invention is to provide a table saw for making mitre cuts in accordance with the preceding object and which will be easy to maintain in condition for operation at maximum efficiency.

Another important object of this invention is to provide a mitre saw which will be economical to manufacture.

Another very important object of this invention is to provide a mitre saw constructed in a manner whereby maximum safety is afforded the operator.

It is another object of this invention to provide a mitre saw which is compact and includes a removable work supporting panel that may be readily stored in a compact space when not in use.

An additional object of this invention is to provide a saw in accordance with the preceding objects and which will be capable of quickly making precision mitre cuts.

Another object of this invention, in accordance with the immediately preceding object, is to provide a mitre saw which may simultaneously make mitre cuts in two different workpieces.

Yet another object of this invention is to provide a mitre saw which may be readily and quickly adjusted for making mitre cuts of different angles.

A further object of this invention is to provide an adjustable angle mitre saw constructed in a manner whereby adjustments thereto may be readily made.

An ancillary object of this invention is to provide a mitre saw designed in a manner such as to be capable of handling at least all standard size picture framing members from four inches in width to two and three-quarter inches in thickness as well as other framing members of greater dimensions if the nitre saw is modified accordingly in size.

Yet another object of this invention is to provide a mitre saw in accordance with the preceding objects which is compact and may be readily moved from one location to another and partially dismantled for ease in storage.

A further important object of this invention is to provide a mitre saw which will be capable of accurately forming a mitre cut in a framing member of substantially unlimited length and of any material capable of being cut by the specific rotary saw blade used.

Another important object of this invention is to provide a mitre saw which will be capable of making an angular cut between 30° and 60° and which could be modified to cut at any angle between 0° and 90°.

A final object of this invention to be specifically enumerated herein is to provide a mitre saw in accordance with the preceding objects and which will conform to conventional forms of manufacture, be of simple construction and easy to use so as to provide a device that will be economically feasible, long lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 3 is a fragmentary enlarged vertical sectional view taken substantially upon the plane indicated by the section line 3—3 of FIG. 1;

FIG. 4 is a fragmentary vertical sectional view taken substantially upon the plane indicated by the section line 4—4 of FIG. 3;

FIG. 5 is an enlarged fragmentary vertical sectional view taken substantially upon the plane indicated by the section line 5—5 of FIG. 1;

FIG. 6 is an enlarged fragmentary top plan view of the free end of one of the work positioning arms and the adjustable angle stop supported therefrom;

Figure 1:
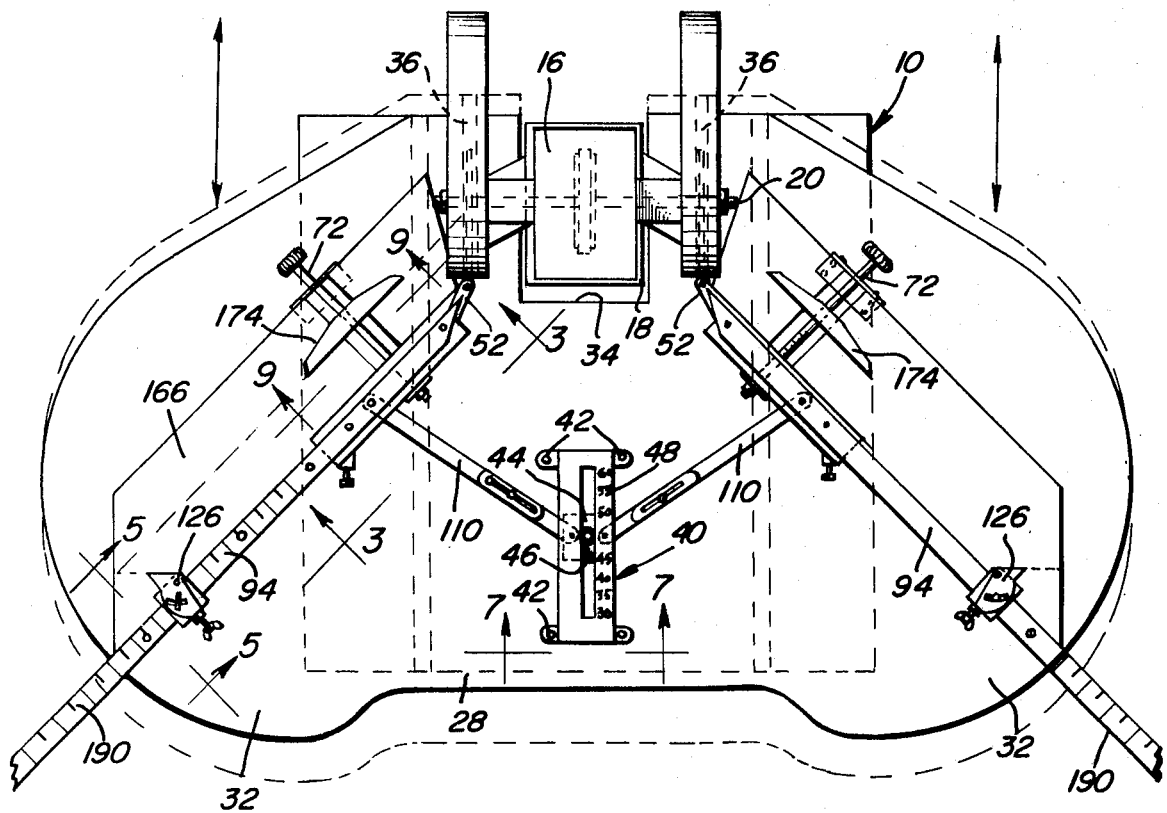
FIG. 1 is a top plan view of a table saw including a pair of rotary saw blades supported at an elevation spaced slightly above the top of the table and with a floating work supporting panel supported from the top of the table and including workpiece supporting structure operative to support workpieces in various angular positions relative to the saw blades.
Figure 2:
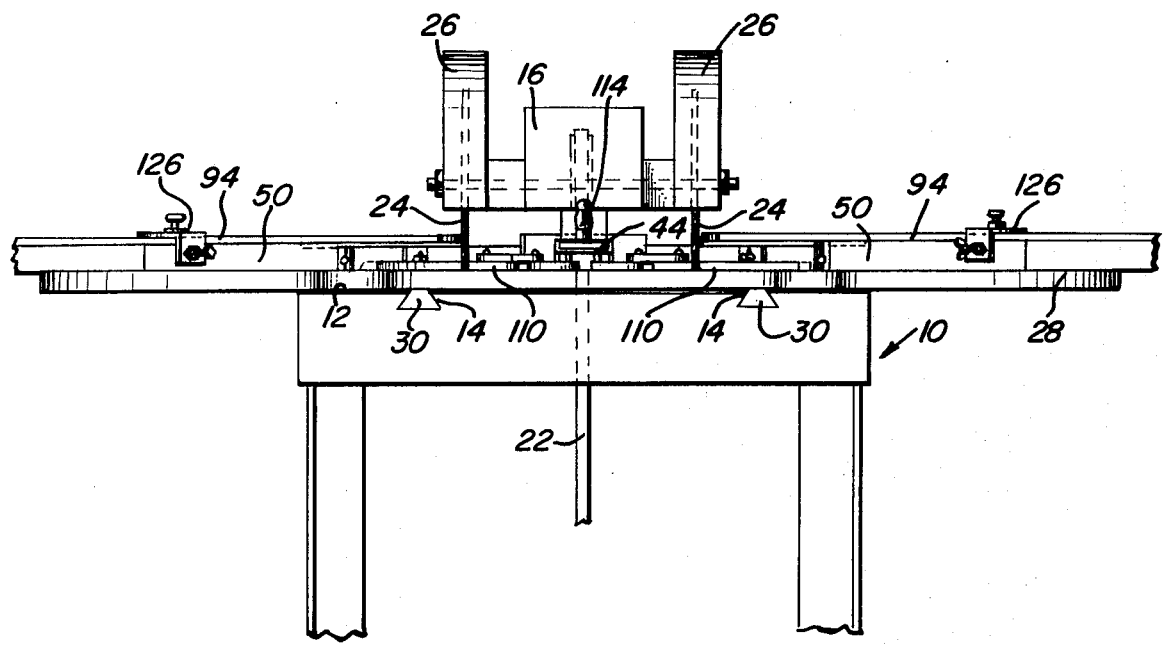
FIG. 2 is a front elevational view of the assemblage illustrated in FIG. 1.
Figure 7:
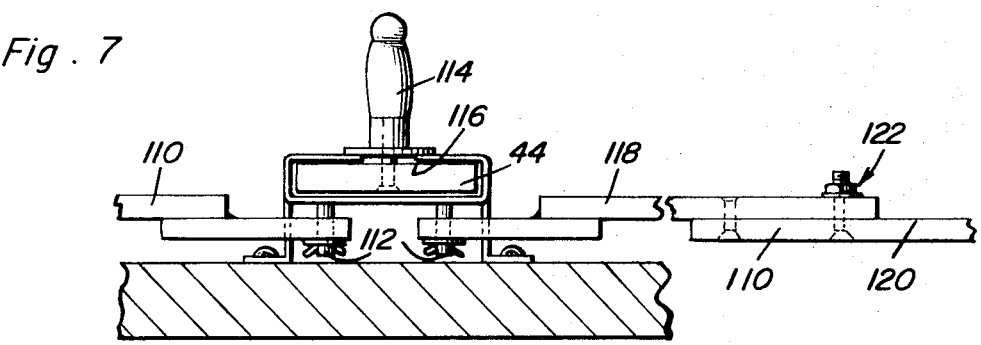
FIG. 7 is a fragmentary enlarged vertical sectional view taken substantially upon the plane indicated by the section line 7—7 of FIG. 1.
Figures 8, 9:
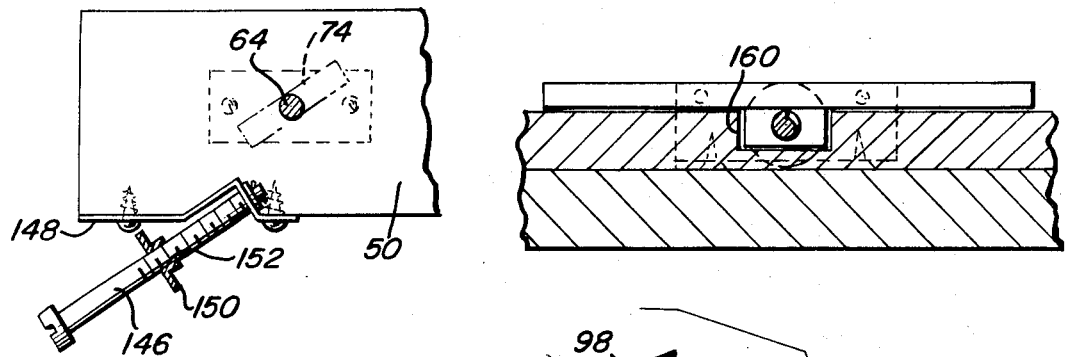
FIG. 8 is a fragmentary enlarged horizontal sectional view illustrating the manner in which the frame member lip adjusting plate shifting structure is supported from one of the work positioning arms of the saw.
FIG. 9 is an enlarged fragmentary vertical sectional view taken substantially upon the plane indicated by the section line 9—9 of FIG. 1.
Figure 10:
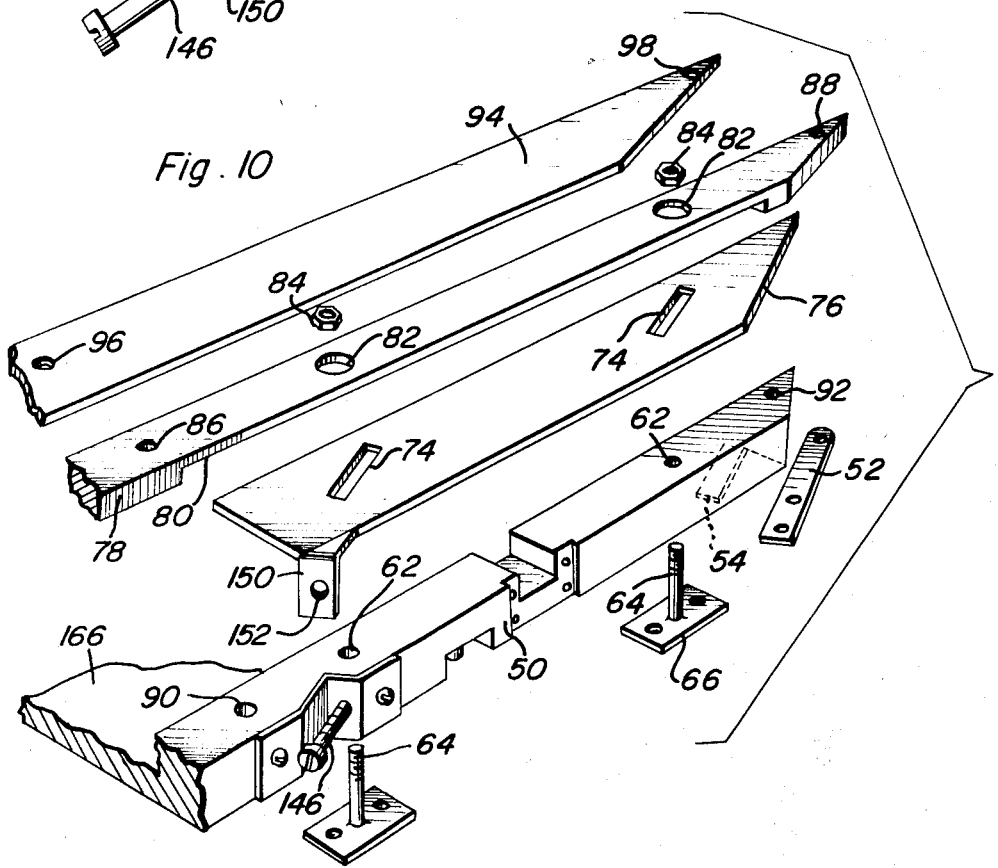
FIG. 10 is an exploded perspective view of one of the work positioning arms.

Referring now more specifically to the drawings, the numeral 10 generally designates a legged saw table including a top 12 having dovetailed grooves 14 formed therein. The grooves 14 are parallel and extend in front-to-rear directions. The rear of the tabletop 12 includes an upstanding support 16 including a base portion 18 and a horizontal transverse mandrel 20 journaled from its upper portion and including a center pulley wheel (not shown) about which the upper end of a vertically disposed endless belt 22 is trained. The lower end of the belt 22 is trained about a drive pulley (not shown) mounted on the output shaft of an electric motor (not shown) supported from a lower portion of the saw table 10.

The opposite ends of the mandrel 20 have a pair of vertical rotary saw blades 24 mounted thereon and the support 16 includes downwardly opening shields 26 which shield the upper halves of the saw blades 24.

A work supporting panel 28 is provided and includes underside dove-tailed rails 30 which are guidingly and slidingly received in the dovetailed grooves 14 with the undersurface of the panel 28 spaced slightly above the upper surface of the tabletop 12. The opposite sides of the panel 28 include forwardly divergent wing portions 32 and the rear marginal edge portion of the panel 28 includes a forwardly opening notch 34 in which the base portion 18 of the support 16 is received, the forward extremity of the notch 34 defining the rearward limit of movement of the work supporting panel 28 relative to the tabletop 12 by the seating of the forward portion of the base portion 18 in the forward end of the notch 34. Also, the lower marginal edge portions of the saw blades 24 are spaced above the tabletop 12 and project downwardly slightly below the upper surface of the work supporting panel 28, the latter having front-to-rear extending upwardly opening grooves 36 formed in its rear portion on opposite sides of the notch 34 in which the lower peripheral portions of the saw blades 24 are receivable.

A guide frame referred to in general by the reference numeral 40 is secured in the center of the forward portion of the panel 32 to its upper surface by means of fasteners 42 and the frame 40 guidingly supports a follower 44 therefrom for front-to-rear movement relative to the work supporting panel 28 and the follower 44 includes a pointer 46 registrable with indicia 48 formed on the guide frame 40.

A pair of work positioning arms 50 are provided and include corresponding pivot plates 52 at one pair of corresponding ends thereof secured thereto in relieved areas 54 thereof by means of suitable fasteners 56. The pivot plates 52 include extended end portions which are pivotally anchored to the work supporting panel 28 by means of pivot fasteners 60 aligned with the forward ends of the grooves 36. In addition, each of the arms 54 has a pair of upstanding bores 62 formed therethrough, through which externally threaded studs 64 extend. The lower ends of the studs 64 are supported from anchor plates 66 secured in recesses 70 formed in the undersides of the arms 50 by means of fasteners 72. The studs 64 project upwardly through the bores 62 and also through diagonal slots 74 formed through a pair of lip adjustment plates 76 overlying the upper surfaces of the arms 50. An arm plate 78 extends along the upper surface of each arm 50 and includes a recessed portion 80 in which the corresponding plate 76 is received. Each arm plate 78 includes a pair of large diameter bores 82 in which the upper ends of the shanks 64 are received, the latter having nuts 84 threadedly engaged thereon with the nuts 84 received in the bores 82. The opposite ends of each plate 78 include upstanding bores 86 and 88 registrable with corresponding bores 90 and 92 formed in the corresponding ends of the associated arm 50. In addition, a rule plate 94 overlies each arm plate 78 and has opposite end bores 96 and 98 formed therein registrable with the corresponding bores 86 and 88 and the bores 90 and 92, fasteners 100 being utilized to secure the plates 78 and 94 to the corresponding arms 50 and being secured through the registered bores 96, 86, 90 and 98, 88 and 92.

Each arm 50 has a central recess 102 formed in its underside and a mounting plate 104 is secured in each recess 102 by means of suitable fasteners 106. Each mounting plate includes a depending pivot pin 108 and corresponding ends of a pair of adjustable length arms 110 are pivotally anchored to the pins 108. The other pair of corresponding ends of the arms 110 are pivotally anchored to depending pivot pins 112 carried by the follower 44, the latter including an upwardly projecting handle 114 slidably received through the slot 116 extending longitudinally of the guide frame 40.

Each of the arms 110 includes overlapped inner and outer end sections 118 and 120 secured together by means of a clamp type pin and slot connection referred to in general by the reference numeral 122, whereby the effective length of each arm 110 may be adjusted as desired.

Each rule plate 94 has an adjustable friction slide supported therefrom and each slide 126 includes an adjustable abutment plate 128 on one side of the corresponding arm 50 frictionally engaged with the corresponding abutment plate 78 and rule plate 94 and an adjustable tension spring abutment slide 130 engaged with the opposite side of the arm plate 78. The slide 126 has an angle plate 132 pivotally supported therefrom by means of a pivot fastener 134 and each abutment plate 132 is slotted as at 136 and receives a clamp screw 138 through the corresponding slot 136 whereby the angle plate 132 may be clamped in adjusted angularly displaced position relative to the slide 126. Each angle plate 132 includes an abutment edge 140 adapted to be engaged by the adjacent end of a workpiece 142, see FIG. 6.

An adjustment screw 146 is journaled from a support plate 148 carried by each arm 50 and each lip adjusting plate 76 includes a depending inner side flange 150 provided with a threaded aperture 152 through which the corresponding screw 146 is threadedly engaged. Accordingly, the screws 146 may be rotated so as to diagonally shift the lip adjusting plates 76 and the extent that remote longitudinal edge portions thereof project beyond the corresponding longitudinal edge portions of the work positioning arms 50.

The arms 50 have upwardly opening transverse grooves 160 formed therein and the inner side of each arm 50 has a plate 162 secured thereto by means of fasteners 164, each plate 162 having a bore 166 formed therethrough. The outer sides of the arms 50 include outward extensions 167 including angle journal plates 168 secured from their outer ends. The journal plates 168 include upstanding flanges 170 through which clamp screws 172 are journaled and a pair of threaded clamping heads 174 are slidably disposed on the upper surfaces of the extensions 167 and have the clamp screws 172 threadedly engaged therethrough. The opposite ends of the clamp screws 172 pass through the grooves 160 and have abutment members 178 mounted on their terminal ends abuttingly engaged with abutment plates 182 whose upper marginal portions are abutted against the inner marginal edges of the lip adjustment plates 76 as at 184. In this manner, a picture framing member 186 may be clamped between the lip adjusting plate 76 and the corresponding clamp head 174 by means of the clamp screw 172. Of course, the projection of the rear longitudinal marginal edge portions of the lip adjustment plate 76 beyond the rear marginal edge portions of the plates 78 and 94 is determined by the adjustment of the screws 146.

In operation, the lip adjustment plates 76 may be adjusted as desired according to the lip of the picture framing members 186 to be cut. Then, the members 186 may be clamped in position and the follower 44 may be shifted along the guide frame 40. Of course, adjustment of the follower 44 along the frame 40 will adjust the arms 50 to the desired angle. Then, if the framing members 186 to be cut have not yet been placed in position, the framing members 186 are clamped in position after the lip adjusting plates 76 have been adjusted as desired. The saw blades 24 may then be set into motion and the work supporting panel 28 is shifted rearward relative to the table 10 to advance the adjacent ends of the picture framing members 186 into the saw blades 24. After the first pair of corresponding ends of the picture framing members 186 have been cut, they may be removed and reversed end to end with the first cut ends of the work framing members 186 abutted against the edges 140 of the abutment plates 132 after the latter have been properly adjusted. Then, the slides 126 may be shifted along the rule plates 94 to the desired positions and the work supporting panel 28 may again be advanced toward the saw blades 24 so as to cut the other ends of the picture framing members 186.

If the framing members are excessively long, extensions 190 may be secured on the outer ends of the rule plates 94 and the slides 126 may be shifted onto the extensions 190. Further, inasmuch as the forward extremity of the notch 34 limits rearward movement of the work supporting panel 28, the saw blades 24 may not engage the adjacent ends of the arms 50, the pivot plates 52 or the fasteners 60.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a support table including a top and powered axially spaced rotary saw means journaled from said table with the lower peripheral edges of said saw means spaced above said top, a floating work support panel, said tabletop and panel including coacting means supporting said panel from said top in overlying relation relative thereto for guided rectilinear shifting along a central path normal to the axes of rotation of said saw means and centrally spaced between said rotary saw means, a pair of arm means including one pair of convergent ends pivotally supported from said panel for angular displacement about axes equally spaced from said central path on opposite sides thereof and generally disposed at generally right angles relative to said path and the axes of rotation of said saw means, said arm means including work engaging means for engaging workpieces disposed on said panel along said arm means and releasably retaining said workpieces in adjusted position relative to said arm means, said panel and arms including coacting adjustment means for inversely equally angularly displacing said arms relative to said panel with said arms oppositely and equally inclined relative to said path.

2. The combination of claim 1 wherein said coacting means includes parallel guideway and rail means guidingly and slidingly received in said guideway means on said tabletop and support panel.

3. The combination of claim 2 wherein said panel member is slightly spaced above said tabletop.

4. The combination of claim 1 wherein said arm means include clamp means for clamping a workpiece thereto along one longitudinal edge of said arm means.

5. The combination of claim 4 wherein said arm means include longitudinally extending plate means overlying the upper surfaces thereof and supported from said arm means for adjustable lateral shifting relative to said arm means as well as extension and retraction relative to one longitudinal edge portion of said arm means.

6. The combination of claim 5 wherein said arm means include slide means mounted thereon for adjustable positioning therealong, said slide means including an abutment member projecting horizontally outwardly of said one longitudinal edge portion of said arm means and including an abutment surface facing generally toward the axis of angular displacement of said arm means, said abutment member being supported from said slide means for limited angular displacement relative to said slide means.

7. The combination of claim 6 wherein said arm means includes removable extension means on one end thereof, the axis of angular displacement of said arm means relative to said panel being disposed adjacent the other end of said arm means.

* * * * *